United States Patent [19]

Hagerman

[11] Patent Number: 4,662,941

[45] Date of Patent: May 5, 1987

[54] MINERAL WOOL WASTE CEMENT

[75] Inventor: Robert M. Hagerman, West Chester, Pa.

[73] Assignee: Sheridan Corporation, Lebanon, Pa.

[21] Appl. No.: 789,691

[22] Filed: Oct. 21, 1985

[51] Int. Cl.$^4$ ................................................. C04B 7/14
[52] U.S. Cl. ....................................... 106/89; 106/117
[58] Field of Search ........................... 106/103, 89, 117

[56] References Cited

U.S. PATENT DOCUMENTS

| | | | |
|---|---|---|---|
| 3,615,783 | 10/1971 | Howard | 106/103 |
| 4,047,961 | 9/1977 | Aldrete et al. | 106/103 |
| 4,242,142 | 12/1980 | Gee et al. | 106/103 |

*Primary Examiner*—William R. Dixon, Jr.
*Assistant Examiner*—Steven Capella
*Attorney, Agent, or Firm*—Joseph J. O'Keefe

[57] ABSTRACT

A mineral wool waste cement that includes as an addition to portland cement vitreous and non-vitreous mineral wool plant waste materials. A separate ground mineral wool waste cement can be made by feeding mineral wool waste materials above or by feeding blends of mineral wool waste materials and cementitious furnace slags to a grinding plant and thereafter blending the resulting ground product with portland cement. An interground cementitious slag-portland cement clinker can be produced by feeding to a grinding plant portland cement clinker and cementitious slags made from mineral wool waste materials or combinations of mineral wool waste materials and cementitious furnace slags.

8 Claims, No Drawings

MINERAL WOOL WASTE CEMENT

BACKGROUND OF THE INVENTION

The present invention relates to a mineral wool waste cement and more particularly to a cement that includes, as an addition, i.e. a partial portland cement replacement, various waste materials resulting from the production of mineral wool.

It has been known for many years that various additives can be used as a partial replacement for portland cement to more economically make cementitious products without compromising the long term strength properties of such products.

Ground furnace slags have been used as a replacement or additive to portland cement since the late 1800's. Since that time the slags from blast furnaces, steel furnaces, copper furnaces, phosphate furnaces, etc. have all been used in different forms for such purposes. They have been added to portland cement clinkers in various percentages and interground, or they have been ground separately and blended with portland cement.

For example, U.S. Pat. No. 1,916,157 describes a cement consisting of portland cement and cupola slag, which is different from blast furnace slag that is also used in cement manufacture. U.S. Pat. No. 3,582,377 discloses the use of "non cement" materials as substitutes for portland cement or silica flour to make precast masonry products. Specifically there is described the use of ordinary air-cooled blast furnace slag to produce masonry blocks, although theretofore such air-cooled slag was not considered acceptable for such purposes. U.S. Pat. No. 3,825,433 describes the use of "phosphorus furnace slag" and portland cement for making concrete. U.S. Pat. No. 4,451,295 describes an improved cement for making concrete and mortar. The cement comprises a mixture of calcium carbonate or portland cement kiln dust, or both, and ground granulated blast furnace slag.

In addition to furnace slags, other materials have been added to portland cement to make concrete and masonry products. U.S. Pat. No. 3,202,522 describes the dispersion of asbestos fiber, preferably about 10%–40% by weight, throughout cementitious materials or constituents, including a slag cement component. The fiber acts as a mechanical reinforcement, as in common asbestos portland cement compositions or products thereof. U.S. Pat. No. 3,823,021 describes a cement composition and an addition for use in hydraulic cementitious mixtures, such as grouts, mortars and concrete. The composition comprises as a cement, silica sand and soda lime glass particles having a size within a specified range.

In recent years there has been broader acceptance and greater confidence in the performance of interground and blended slag-portland cements. In Europe the production of slag cements represents 20% of total cement production. Although, for many years, the cement industry in the United States resisted acceptance of additives because of the erosion it caused in prices, more recently the industry has accepted the use of cement additives in order to more economically manufacture products that can compete with the prices of imported cement.

There is contained in U.S. Pat. No. 3,096,188, a disclosure of a composition material adapted to use previously discarded portions of comminuted blast furnace slag. A granular slag is produced by quenching a molten blast furnace melt, rich in silicic acid, in an agitated cooling fluid to form a sharp edge glassy sand having large brittle grains. The sand is crushed to specified particle size and mixed, in a specified range, with water and a hydraulic binder, such as portland cement, gypsum or lime.

U.S. Pat. No. 3,615,783 discloses a hydraulic cement that uses, in combination with portland cement, a mineral wool manufacturing by-product, which is made from modified blast furnace slag. In the process of manufacturing mineral wool, blast furnace slag is remelted with the addition of silicon dioxide and alumina, which has a ratio of silicon dioxide substantially higher than lime. The remelted slag plus additions is referred to as modified slag. The modified slag is discharged from the furnace, under the influence of steam and air cooled. About half of the modified slag is formed into fibers commonly referred to as "mineral wool" and collected, while the residue, known as mineral wool shot or shot slag, is precipitated and discarded. In contrast to prior belief, the patentee found that the shot slag, with the ratio of silicon dioxide substantially higher than lime, is virtually 100 percent glass, and has excellent latent hydraulic cementicity. The shot slag, reduced to a finely divided state, and mixed with portland cement, can be used in varying ways to produce a hydraulic cement product.

Thus it has been known to use, as described above, various additives as a partial replacement for portland cement to more economically make cementitious products. And it has been known to use modified shot slag, having a ratio of silicon dioxide substantially higher than lime, a by-product of the mineral wool manufacturing process, as an additive for portland cement to make a hydraulic cement product. However, there remain substantial wastes, other than shot slag, which are found as by-products of mineral wool plants and for which heretofore no use has been found. As a consequence, mineral wool plant waste material from a variety of locations within such a plant are presently discarded and dumped on unsightly refuse piles that adjoin the plants.

SUMMARY OF THE INVENTION

It is a primary object of this invention to provide an improved composition material to utilize previously discarded waste material of mineral wool plants.

Another object of this invention is to provide a hydraulic cementitious product that conforms to ASTM (American Society For Testing Materials) standards for hydraulic cement and can be economically produced.

A further object of the invention is to provide a hydraulic cementitious product that makes use of mineral wool plant waste materials so as to reduce the unsightly refuse piles on which such waste materials are presently discarded and stored.

The present invention relates to the use of mineral wool plant wastes as an addition to portland cement to produce, by an energy efficient process, a low cost commercially acceptable cementitious product.

DESCRIPTION OF THE PREFERRED EMBODIMENT

In the production of mineral wool from various ground furnace slags, manufacturing processes make about 50 percent of the furnace feed stock into commercially acceptable mineral wool, while the remaining 50 percent is rejected waste materials that are presently discarded. Such waste materials are produced in a number of locations of a plant, including the furnace discharge, at the spinners, in the dust collectors, in the scrubbers, in the cyclone separators, at separating screens, from spillage on floors, from rejected fibers, etc. The waste materials occur in a variety of forms. About 15-20 percent occur as very small to large beads of glassy slag, i.e. shot slag, while the remainder occur as fibers, as agglomerates of wholly or partially melted furnace feed, as dust, etc. Some agglomerations may be as large as 12 inches or more, but the highest percentage is less than 1 inch in size.

Although there is no reasonable way of determination, from a process viewpoint, it is believed that almost half of the waste materials are vitreous, i.e. glassy, and the other half non-vitreous. i.e. non-glassy. From a practical viewpoint there is no economical way of separating such waste materials into glassy and non-glassy portions, which is probably one of the principle reasons that the wastes have been discarded.

Surprisingly, particularly in view of prior beliefs and teachings, it has been found that such mineral wool plant waste materials, i.e. both vitreous and non-vitreous, can be used, without beneficiation or separation, except to remove iron particles, to make commercially acceptable cementitious products.

It is difficult to draw specific conclusions on relative hydraulicity, i.e. the property of solidifying or curing in the presence of water, of mineral wool wastes. However, with adequate water or air quenching in the mineral wool process, by practices known to operators of mineral wool plants, waste materials with a composition range as listed in Table I will have fair to excellent hydraulicity when interground with portland cement clinker or ground separately and blended with portland cement.

TABLE I

|  | Wt. Percent |
|---|---|
| CaO | 25-45 |
| SiO$_2$ | 30-50 |
| Al$_2$O$_3$ | 7-15 |
| MgO | 3-15 |
| MnO | 0-1 |
| Fe | 0-10 |

The compressive strengths that result from the production of cement products that contain mineral wool waste materials may be modified by adjusting the fineness of grind. A finer grind will increase the strength of the end concrete results as compared to a coarser grind.

A separate ground mineral wool waste cement can be made by first feeding 100 percent mineral wool waste materials or blends of mineral wool waste materials and cementitious blast furnace slag to a grinding plant and thereafter blending the resulting ground product with portland cement. An interground cementitious slag-portland cement clinker may be produced by feeding to a grinding plant 2 percent to 60 percent cementitious slags made from 100 percent mineral wool waste materials or combinations of mineral wool waste materials and cementitious blast furnace slags and 40 percent to 98 percent portland cement clinker. A portion, 0 to 5 percent, of the portland cement clinker may be replaced by gypsum. The gypsum retards the setting of the interground material during storage. The amount of gypsum required is dependent upon the analysis of the waste material from individual mineral wool plants. The feed to the grinding plant is ground to a Blaine fineness of at least 3500 (85 percent minus 325 mesh). Preferably the waste materials may be ground to a Blaine fineness of about 4600. While the grinding may be finer, the cost of additional grinding increases the cost of the end product.

EXAMPLES

An interground mineral wool waste cement is prepared by feeding a mixture of 60 percent portland cement clinker, 5 percent gypsum and 35 percent cementitious furnace slag, which consists of 50 percent mineral wool waste materials and 50 percent cementitious blast furnace slag, to a mill in which the mixture is ground to a Blaine finess of 4520. A test specimen of the cement was formed into a 2-inch mortar cube and cured according to the requirements of ASTM Test C-109. The compressive strength of the 65/35 sample cube was determined after intervals of 1, 3, 7 and 28 days.

In Table II, there is shown in column 1, the results of the compressive strength determinations after similar intervals of a sample cube of 100 percent portland cement ground to 3521 Blaine fineness, and in column 2 the results of the compressive strength determinations of the 65/35 interground mineral wool waste cement.

TABLE II

| Cement | 100 Portland Cement | Interground Mineral Wool Waste Cement 65/35 |
|---|---|---|
| Blaine fineness | 3521 | 4520 |
| 1 Day Compressive Strength (p.s.i.) | 2075 | 1311 |
| 3 Days Compressive Strength (p.s.i.) | 3533 | 2491 |
| 7 Days Compressive Strength (p.s.i.) | 4600 | 3699 |
| 28 Days Compressive Strength (p.s.i.) | 5728 | 5693 |

As can be observed, after 1, 3 and 7 days the compressive strength of the 65/35 interground mineral wool waste cement was substantially lower than the compressive strength of the 100 percent portland cement. However, by day 28, the compressive strength of the 65/35 interground mineral wool waste cement is approaching that of the 100 percent portland cement. Although not shown in Table II, the strength of the 65/35 interground mineral wool waste cement continues to increase so that ultimately it is stronger than the 100 percent portland cement.

Other mineral wool waste cements were prepared by blending various percentages of cementitious slag with portland cement. The cementitious slags consisted of various percentages of mineral wool waste materials and cementitious blast furnace slag. Test specimens of such mineral wool waste cements were formed into 2-inch mortar cubes which were cured and the compressive strengths determined in a manner similar to that described above. The results of such determinations, along with the compressive strength determinations for laboratory sample cubes of 100 percent portland cement are presented in Table III.

TABLE III

| | Sample Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | | | | | | Type Cement | | | | | | |
| | 100% Portland | 50/50 Blend | 100% Portland | 95/15 Blend | 85/15 Blend | 75/25 Blend | 50/50 Blend | 100% Portland | 95/5 Blend | 85/15 Blend | 75/25 Blend | 50/50 Blend |
| Blaine Fineness (Portland) | 3757 | 3757 | 3757 | 3757 | 3757 | 3757 | 3757 | 3521 | 3521 | 3521 | 3521 | 3521 |
| Blaine Fineness (Blend) | — | 4362 | — | 4554 | 4554 | 4554 | 4554 | — | 4554 | 4554 | 4554 | 4554 |
| 1 Day Compressive Strength (p.s.i.) | 2275 | 938 | 2475 | 2425 | 2075 | 1825 | 925 | 2267 | 2150 | 1825 | 1600 | 850 |
| 3 Day Compressive Strength (p.s.i.) | 3825 | 1953 | 4075 | 3950 | 3625 | 3025 | 2075 | 3700 | 3425 | 3150 | 2825 | 1925 |
| 7 Day Compressive Strength (p.s.i.) | 4600 | 2858 | 4892 | 4625 | 4288 | 4063 | 3063 | 4767 | 4488 | 4288 | 4000 | 2900 |
| 28 Day Compressive Strength (p.s.i.) | 5575 | 4942 | 5850 | 5713 | 5488 | 5325 | 5025 | 5975 | 5775 | 5613 | 5500 | 5075 |

Sample 1 - Average of several days production of 100 percent portland cement (no gypsum).
Sample 2 - Average over 10 months of a 50/50 blend, i.e. 50% portland cement and 25% mineral wool waste material and 25% cementitious blast furnace slag.
Sample 3 - Single sample of 100 percent portland cement of Company A.
Samples 4–7 - Single Samples of various blend ratios of portland cement/mixture of 50 percent mineral wool waste and 50 percent cementitious blast furnace slag.
Sample 8 - Single sample of 100 percent portland cement of Company B.
Sample 9–12 - Single samples of various blend ratios of portland cement/mixture of 50 percent mineral wool waste and 50 percent cementitious blast furnace slag.

The results shown in Table III are similar to those of Table II. After 1, 3 and 7 days the compressive strengths of the samples of blends of portland cement and mixtures of 50 percent mineral wool waste and 50 percent cementitious blast furnace slag are lower than the compressive strengths of the 100 percent portland cement samples. By day 28 the compressive strengths of the samples of blends of portland cement and mixtures of mineral wool waste and blast furnace slag approach the compressive strength of the 100 percent portland cement samples.

As can be observed in Table III, if for some reason it is desirable for a blend of cementitious slag cement to have as much strength as possible after 28 days, the blend should preferably have 5 to 25 percent of the mixture of mineral wool waste and cementitious blast furnace slag and 95–75 percent portland cement. And if it is desired that a mineral wool waste cement have a strength approaching that of 100 percent portland cement after a short period, e.g. 3 days, the Blaine fineness of the mineral wool waste materials and cementitious blast furnace slag combined with the portland cement can be increased by about 15–25 percent as compared to the normal range of about 4000 to 4600 Blaine fineness.

As is well known to those skilled in concrete construction it is not always desirable to have high early strength cements. Interground and blended mineral wool waste cements have lower heat of hydration than 100 percent portland cement which permits longer time for concrete to be finished. The slower curing of blended cements takes place at lower temperatures and without the cracking that occurs with 100 percent portland cement. Interground and blended mineral wool waste cements are also more resistant than 100 percent portland cement to attack by sulfates and chlorides.

The economical advantages of using mineral wool waste materials as additives to portland cement are obvious. The lower cost waste materials replace higher cost portland cement without any apparent disadvantages in most instances.

While this invention has been described with respect to several examples, modifications and variations can be made by those skilled in the art without departing from the spirit and scope of the invention as defined in the appended claims.

I claim:

1. A mineral wool waste cement consisting essentially of both vitreous and non-vitreous mineral wool waste materials blended with portland cement all reduced to a finely divided state.

2. The mineral wool waste cement of claim 1 wherein up to 5 percent by weight of portland cement is replaced by gypsum.

3. The mineral wool waste cement of claim 1 wherein the mineral wool waste materials and portland cement are ground to a Blaine fineness of about 3500 to 4600.

4. A mineral wool waste cement consisting essentially of a mixture of both vitreous and non-vitreous mineral wool wate waterials and cementitious furnace slag blended with portland cement.

5. The mineral wool waste cement of claim 4 wherein the cementitious furnace slag is blast furnace slag.

6. The mineral wool waste cement of claim 4 wherein the proportion by weight of portland cement is about 95 to 50 percent and the proportion by weight of mineral wool waste materials is about 25 to 2.5 percent, the balance cementitious furnace slag.

7. A mineral wool waste cement consisting essentially of mineral wool waste materials comprising vitreous mineral wool waste materials in an amount between about 15 and 50 percent and the balance non-vitreous mineral wool waste materials, blended with portland cement, all reduced to a finely divided state.

8. A mineral wool waste cement consisting essentially of a mixture of mineral wool waste materials comprising vitreous mineral wool waste materials in an amount between about 15 and 50 percent and the balance non-vitreous mineral wool waste materials, and cementitious furnace slag blended with portland cement.

* * * * *